United States Patent [19]

D'Souza

[11] Patent Number: 5,453,259
[45] Date of Patent: Sep. 26, 1995

[54] TWO-BED REGENERATIVE THERMAL OXIDIZER WITH TRAP FOR VOLATILE ORGANIC COMPOUNDS

[75] Inventor: Melanius D'Souza, San Dimas, Calif.

[73] Assignee: Smith Engineering Company, Ontario, Calif.

[21] Appl. No.: 229,367

[22] Filed: Apr. 18, 1994

[51] Int. Cl.⁶ .................................................. B01D 53/72
[52] U.S. Cl. ............................ 423/245.1; 423/245.3; 95/148; 165/909
[58] Field of Search .................. 423/245.3, 245.1, 423/210; 432/5, 180; 165/104.14, 909; 422/175; 502/518; 95/148

[56] References Cited

U.S. PATENT DOCUMENTS

| | | | |
|---|---|---|---|
| 3,764,259 | 10/1973 | Alexander, Jr. | 432/180 |
| 3,870,474 | 3/1975 | Houston | 23/277 |
| 3,953,190 | 4/1976 | Lange | 65/335 |
| 4,004,885 | 1/1977 | Groenendaal et al. | 23/260 |
| 4,039,290 | 8/1977 | Inada et al. | 23/284 |
| 4,119,395 | 10/1978 | Hatanaka et al. | 431/11 |
| 4,478,574 | 10/1984 | Okuno et al. | 432/180 |
| 4,976,611 | 12/1990 | Knop et al. | 432/181 |
| 5,026,277 | 6/1991 | York | 432/181 |
| 5,078,979 | 1/1992 | Dunne | 423/212 |
| 5,129,332 | 7/1992 | Greco | 110/233 |
| 5,161,968 | 11/1992 | Nutcher et al. | 432/179 |

FOREIGN PATENT DOCUMENTS

| | | | |
|---|---|---|---|
| 0208490 | 1/1987 | European Pat. Off. | 423/245.1 |
| 62-244423 | 10/1987 | Japan | 423/245.1 |

*Primary Examiner*—Gary P. Straub
*Assistant Examiner*—Timothy C. Vandy
*Attorney, Agent, or Firm*—Christie, Parker & Hale

[57] ABSTRACT

A regenerative thermal oxidizer system is useful for treating a waste gas stream that contains volatile organic compounds. Two regenerators each contain heat exchange material that is arranged within the regenerators to recover heat generated by the oxidation of the volatile organic compounds. A first regenerator is in heating service and is used to preheat the waste gas stream before it enters an oxidation chamber where the volatile organic compounds are oxidized. From the oxidation chamber, the waste gas stream enters a second regenerator in cooling service where a portion of the heat generated by the oxidation reactions is recovered. When it is necessary to reverse the flow of waste gas through the regenerative thermal oxidizer, a trap for adsorbing volatile organic compounds is engaged. The trap is useful for capturing any volatile organic compounds contained in the untreated gas in the heating regenerator that would otherwise be released to atmosphere when the heating regenerator is switched into cooling service. During normal operation when the trap is not needed, the adsorbed volatile organic compounds can be desorbed by passing a stream of hot gas through the trap. This hot gas stream is preferably recycled back to combine with the waste gas stream for treatment in the regenerative thermal oxidizer.

13 Claims, 4 Drawing Sheets

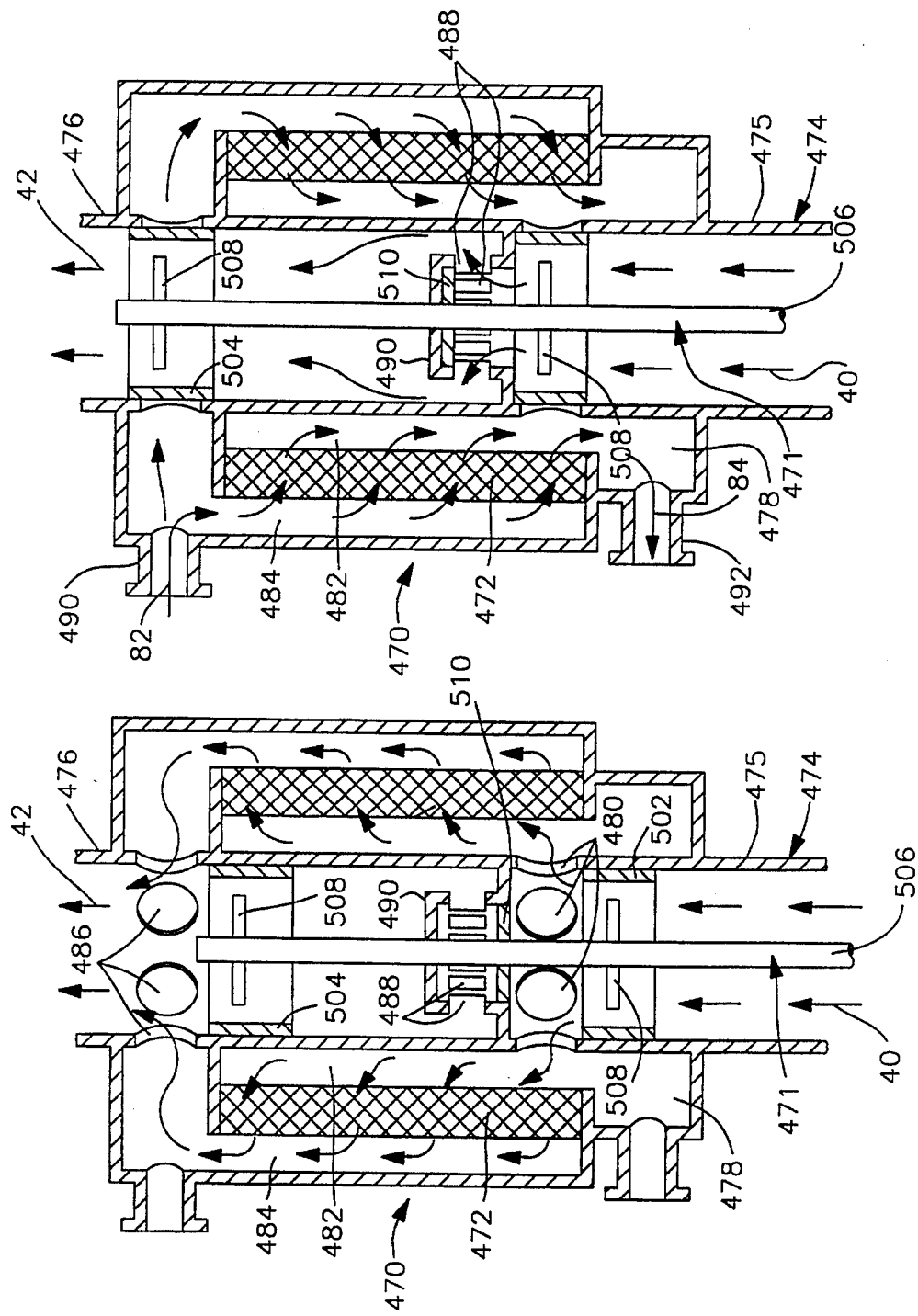

TWO-BED REGENERATIVE THERMAL OXIDIZER WITH TRAP FOR VOLATILE ORGANIC COMPOUNDS

FIELD OF THE INVENTION

The present invention relates generally to regenerative thermal oxidizer systems for treating waste gas streams by oxidizing any volatile organic compounds that may be present. In particular, it relates to a two-bed regenerative thermal oxidizer with a trap for adsorbing any volatile organic compounds that might otherwise escape after the bed reversal step.

DESCRIPTION OF THE RELATED ART

Regenerative thermal oxidizer systems are useful for treating waste gas streams by destroying any volatile organic compounds that may be contained in such streams. Such systems are increasingly important as ever stricter environmental regulations severely limit the levels of volatile organic compounds that may be released to the atmosphere.

It is well known to oxidize the volatile organic compounds found in a waste gas stream in a regenerative thermal oxidizer system. Regenerative thermal oxidizers incorporate reversible gas flow in order to recapture the heat generated by the oxidation of the volatile organic compounds. Regenerative thermal oxidizer systems generally include a heating regenerator for pre-heating the gas stream that is to be treated, an oxidation chamber for oxidizing the volatile organic compounds or other combustible materials that may be present in the gas stream, and a cooling regenerator for cooling the oxidized gas stream before it is released to the atmosphere. After a period of time the temperature of the heating regenerator starts to drop as heat is transferred to the gas stream. Similarly, the temperature of the cooling regenerator starts to rise as heat from the oxidized gas stream is transferred to the cooling regenerator. After a predetermined period of time has elapsed and/or the regenerator temperatures reach predetermined limits, the flow of gas through the system is reversed so that the cooling regenerator is switched into heating service and the heating regenerator is switching into cooling service.

One problem with such a two-bed regenerative thermal oxidizer is that upon reversal of flow through the system, the gas contained in the heating bed which has now been switched to cooling service is released to atmosphere without first having been treated for removal of the volatile organic compounds. The result is a spike in the emissions of volatile organic compounds released to atmosphere every time the beds are reversed.

In order to overcome this problem, three-bed regenerative thermal oxidizers have been developed in which a first regenerator is in heating service, a second regenerator is in cooling service and a third regenerator is in standby service. Once the temperatures of the heating and cooling regenerators have changed sufficiently, the cooling regenerator is switched to heating service, the standby regenerator is switched to cooling service, and the heating regenerator is switched to standby service. While in standby service, the standby regenerator is purged of untreated gas by passing a flow of gas such as clean air or treated gas through the regenerator in order to drive any remaining untreated gas from it. This untreated gas is generally recycled back to the untreated gas stream at either the heating regenerator inlet or directly into the oxidation chamber. The use of a three-bed regenerative thermal oxidizer system prevents the release of untreated gas when the regenerators are switched. An example of such a three-bed regenerative thermal oxidizer system is described in U.S. Pat. No. 5,026,277 to York.

Another way to prevent a spike of volatile organic compound emissions after the regenerators have been switched is to use a system which includes the ability to bypass the regenerators so that any untreated gas can be purged. For example, the untreated waste gas stream can be bypassed around the heating regenerator and fed directly into the oxidation chamber while a slip stream of gas from the oxidation chamber is passed through the heating regenerator in reverse to purge the heating regenerator of any untreated gas. The purged gas is then generally combined with the untreated gas stream that is fed directly to the oxidation chamber. Once the heating regenerator has been purged, the flow of untreated gas is redirected through the heating regenerator.

Benefits of such two-bed regenerative thermal oxidizers include a lower capital cost for the construction of the system and a physically smaller system which is easier to install. However, one significant problem with such two-bed regenerative thermal oxidizers is that because of the frequent bypassing of untreated gas around the heating regenerator after the regenerators are switched, the thermal efficiency of the system is significantly reduced.

A two-bed regenerative thermal oxidizer system is desired in which both capital cost is low and thermal efficiency is high.

SUMMARY OF THE INVENTION

The present invention relates to a process and a system for treating a waste gas stream containing volatile organic compounds. The volatile organic compounds are converted to carbon dioxide and water in an oxidation chamber. The heat for promoting the oxidation reactions is provided by fuel fed to the oxidation chamber. Air is also fed to the oxidation chamber in order to provide the oxygen necessary for the oxidation reactions. In order to improve the thermal efficiency of the system, the waste gas stream is first passed through a regenerator containing refractory heat exchange material to preheat the gas stream. After the volatile organic compounds have been oxidized, the waste gas stream passes through a second regenerator which also contains refractory heat exchange material which is used to cool the hot oxidized gas stream. Heat is recovered by periodically reversing flow through the regenerator so that the regenerator that was formerly in heating service is switched to cooling service and the regenerator that was formerly in cooling service is switched to heating service. A system of valves is used to carry out this flow reversal.

In order to prevent the release of any untreated gas after the flow has been reversed through the system, the gas from the cooling regenerator passes through a trap for adsorbing any remaining volatile organic compounds. The use of the trap is only necessary immediately after the flow has been reversed. Therefore the trap can be bypassed during the remaining periods. In order to prevent the trap from becoming saturated, the volatile organic compounds are periodically desorbed from the trap. Such a desorption step is generally conducted while the trap is being bypassed. A hot gas stream enters the trap to desorb it of the volatile organic compounds which it contains. This hot gas stream is then recycled back to the untreated waste gas stream for destruction of the volatile organic compounds.

In another embodiment, each regenerator includes a trap at its outlet so that any remaining volatile organic compounds can be adsorbed. When a regenerator is in heating service, its trap can be heated so as to drive the volatile organic compounds from the trap and prevent it from becoming saturated with volatile organic compounds.

In another embodiment, the entire oxidized gas stream is passed through a filter which consists of a moving bed of sorbent such as activated carbon. One portion of the bed is used to adsorb the remaining volatile organic compounds while another portion of the bed is desorbed of the volatile organic compounds by a stream of hot gas.

BRIEF DESCRIPTION OF THE DRAWINGS

The features and aspects of the present invention are more clearly set forth in the following description of the invention and in the drawings in which:

FIGS. 7a and 7b are sectional views illustrating a preferred embodiment for a combined trap and bypass valve.

DETAILED DESCRIPTION OF THE INVENTION

Figure 1A:
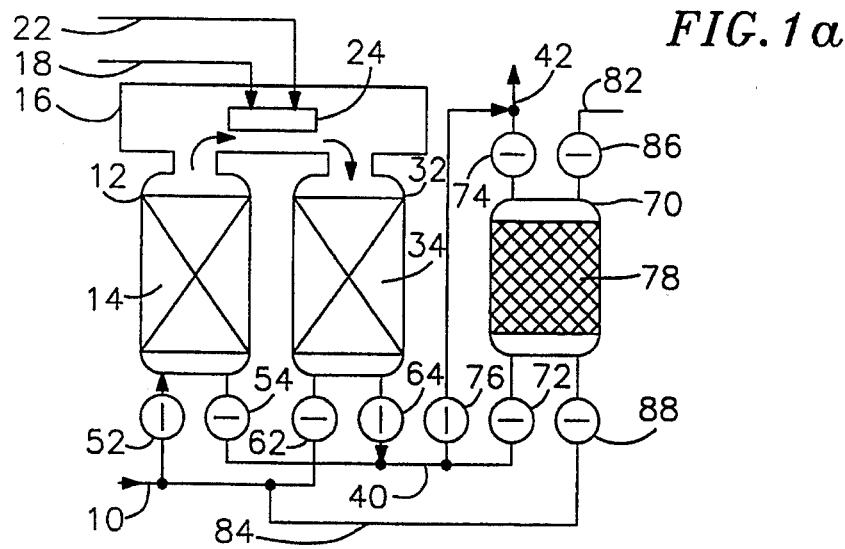
FIGS. 1a, 1b and 1c are schematic flow diagrams showing the equipment used in practicing one embodiment of the invention.
Figure 1B:
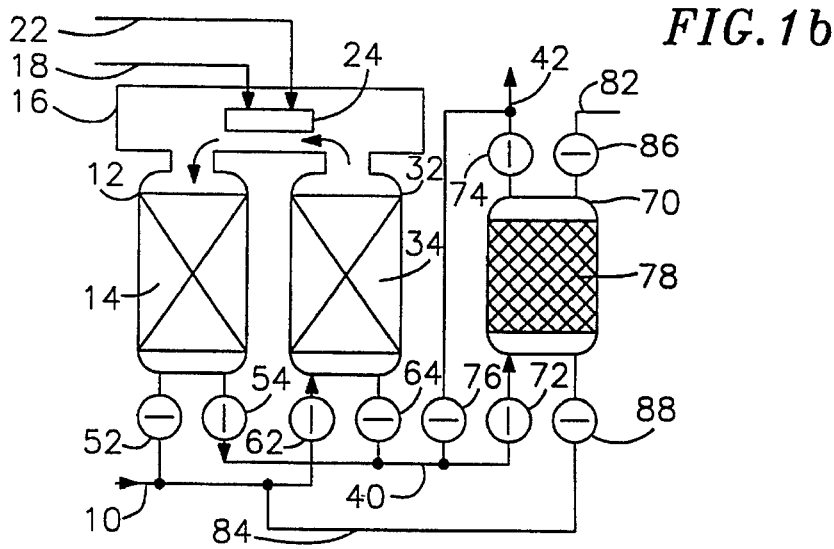
Figure 1C:
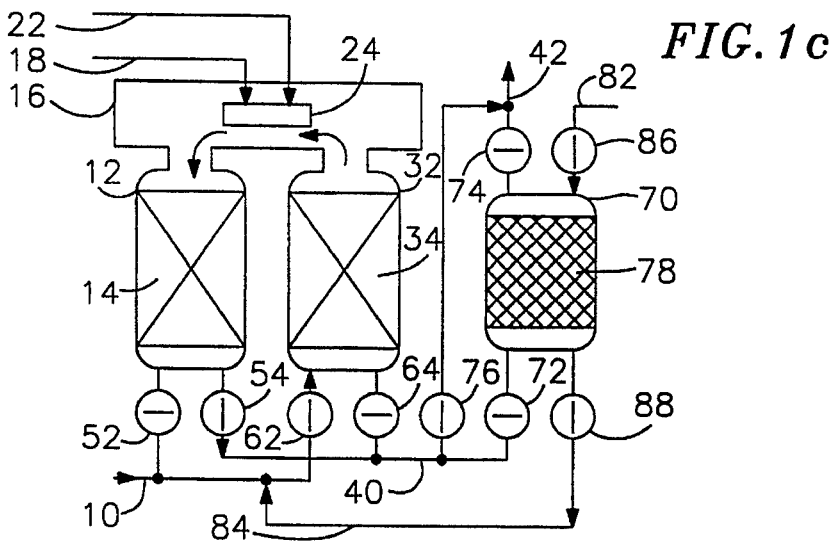

Referring to FIGS. 1a, 1b and 1c, an embodiment of the present invention is illustrated. A waste gas stream 10 containing volatile organic compounds is fed into a first regenerator 12 containing a packed bed 14 of refractory heat exchange material. This first regenerator preheats the waste gas stream before it enters an oxidation chamber 16 for combustion of the volatile organic compounds found in the waste gas stream. In order to promote oxidation of the volatile organic compounds, streams of air 18 and fuel 22 such as natural gas, are fed to a burner 24 located within the oxidation chamber. After the volatile organic compounds have been destroyed in the oxidation chamber, the waste gas stream flows into a second regenerator 32 which also contains a packed bed 34 of refractory heat exchange material for cooling the waste gas stream. A cooling regenerator outlet stream 40 can then be released to atmosphere as a treated waste gas stream 42.

After a period of time, the temperature of the refractory heat exchange material in the first regenerator starts to drop as heat is transferred to the waste gas stream. Similarly, the temperature of the refractory heat exchange material in the second regenerator starts to rise as heat from the hot oxidized waste gas stream is absorbed within the second regenerator. In order to recover the heat generated by the oxidation reactions, the two regenerators are periodically switched. The reversal of the flow of waste gas through the regenerative thermal oxidizer is controlled by a plurality of valves. These valves are preferably operated automatically.

During a first stage, as illustrated in FIG. 1a, a first regenerator inlet valve 52 is opened to place the first regenerator in preheat service by allowing flow of waste gas through the first regenerator and into the oxidation chamber. The first regenerator outlet valve 54 remains closed so as to prevent untreated gas from bypassing the oxidation chamber. The second regenerator has an inlet valve 62 which is closed and an outlet valve 64 which is open while the second regenerator is in cooling service. This allows flow of waste gas from the oxidation chamber through the second regenerator.

In a second stage, as illustrated in FIG. 1b, the flow through the regenerators is reversed so that the waste gas enters the second regenerator for preheating before entering the oxidation chamber. From the oxidation chamber, the oxidized waste gas stream is cooled in the first regenerator. The flow is reversed by first opening the first regenerator outlet valve 54 and the second regenerator inlet valve 62. The first regenerator inlet valve 52 is then closed and the second regenerator outlet valve 64 is closed, to complete the flow reversal step.

Upon reversal of the flow through the regenerators a portion of the waste gas contained within the first regenerator has not yet been treated. In order to avoid a spike of volatile organic compound emissions during the flow reversal, the cooling regenerator outlet stream is directed to a trap 70 for adsorbing the volatile organic compounds. During normal operation, as illustrated in FIG. 1a, an inlet valve 72 and an outlet valve 74 for the trap remain closed while a bypass valve 76 remains open to allow flow of treated waste gas stream around the trap.

Just prior to reversal of the flow through the regenerators, the trap is placed in service to adsorb the volatile organic compounds that are contained in the untreated waste gas that remains in the heating regenerator. This is accomplished by opening trap inlet valve 72 and trap outlet valve 74 and closing trap bypass valve 76 as illustrated in FIG. 1b.

The trap is preferably a pressure vessel containing a packed bed 78 of sorbent for adsorbing volatile organic compounds. Preferred sorbents include activated carbon, zeolites (aluminosilicate sieves), acid-treated clay, activated alumina, activated bauxite, bone char, Fuller's earth, magnesia oxide and silica gel. Once the trap has adsorbed the volatile organic compounds from the untreated waste gas from the first regenerator, the trap is bypassed by opening bypass valve 76 and closing trap inlet and outlet valves 72 and 74, as illustrated in FIG. 1c.

During a portion of the time the trap is being bypassed, a hot gas stream 82 is directed in a reverse direction through the trap, so as to desorb the trap of the volatile organic compounds adsorbed. The hot gas stream which now contains volatile organic compounds is recycled through recycle line 84 to combine with the waste gas stream for treatment in the regenerative thermal oxidizer. The flow of hot gas through the trap is controlled by a hot gas inlet valve 86 and a hot gas outlet valve 88.

Before the flow through the regenerator beds is to be reversed, the flow of hot gas through the trap is stopped by closing the hot gas inlet and outlet valves 86 and 88 as shown in FIGS. 1a and 1b. The trap inlet and outlet valves 72 and 74 are then opened as the trap bypass valve 76 is closed as shown in FIG. 1b. This directs flow of the treated waste gas stream into the trap. At this point the flow through the regenerators can be reversed as the trap will adsorb any volatile organic compounds from the untreated gas remaining in the first regenerator.

After a short period of time in which the trap is used to adsorb the remaining volatile organic compounds purged from the heating regenerator, the trap is once again bypassed, as shown in FIG. 1c. This is accomplished by opening the trap bypass valve 76 and then closing the trap inlet and outlet valves 72 and 74. The volatile organic compounds can then be desorbed from the trap by opening the hot gas inlet and outlet valves 86 and 88.

From the above-description of valve sequencing for the system it is clear that automatic control of the valves is desirable. This can be accomplished by using either pneumatic, electronic or mechanical means for sequencing the valves. It should also be recognized that once the purge has been completed, the trap can be left in standby service with all of its associated valves closed as shown in FIG. 1a.

Figure 2:
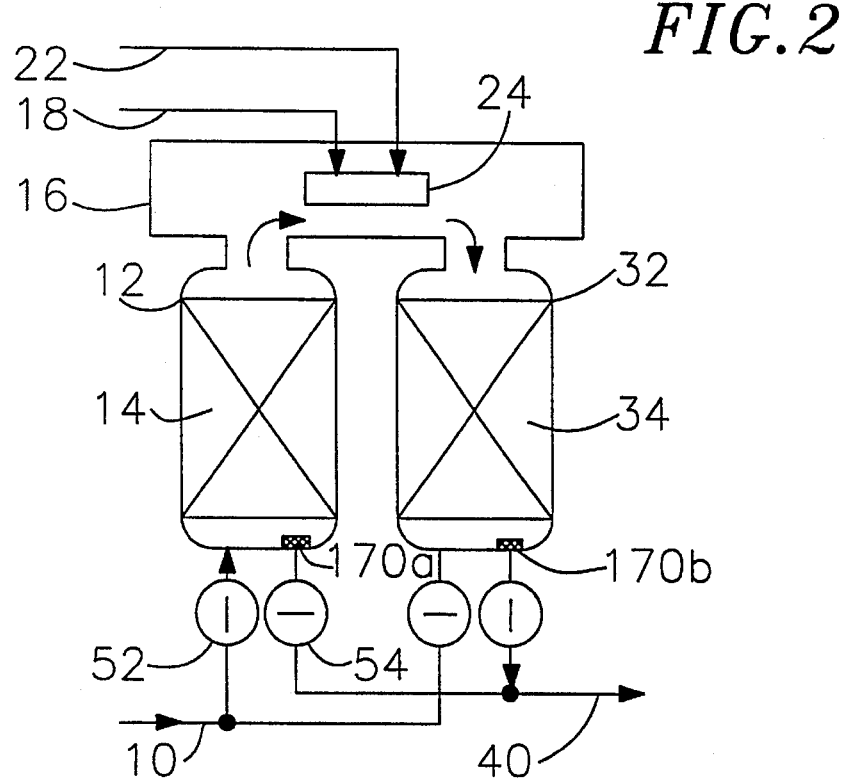
FIG. 2 is a schematic flow diagram showing a second embodiment of the invention.
Figure 3:
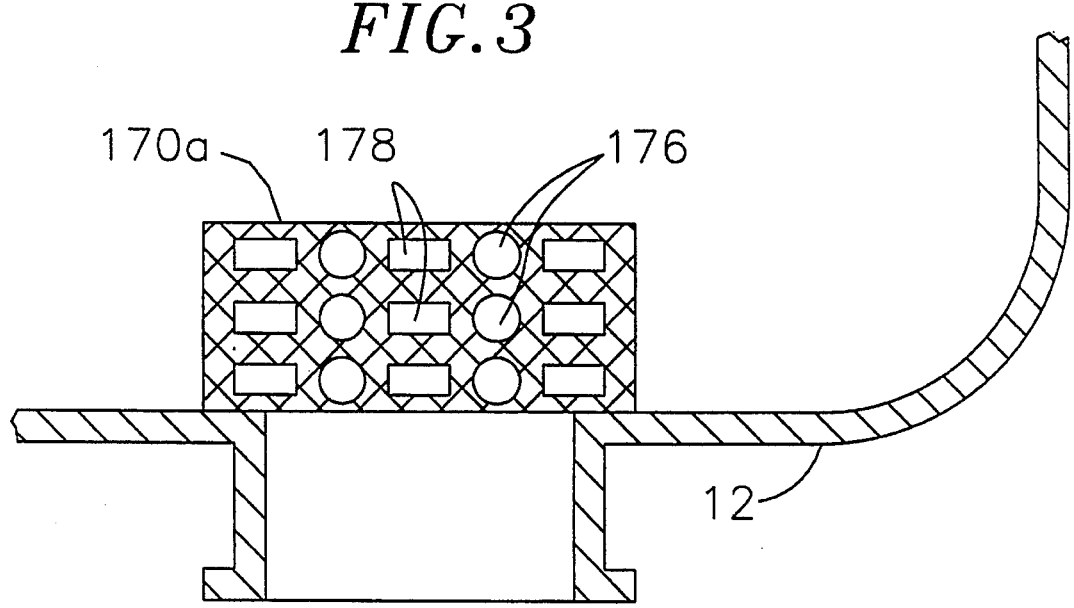
FIG. 3 is a detail of a trap for adsorbing volatile organic compounds.

Another embodiment of the present invention is illustrated in FIG. 2. According to this embodiment, rather than a separate pressure vessel being used as a trap, a pair of elements 170a and 170b are located one within each of the regenerators at its respective outlet for the cooling mode. Because sorbents are most effective at adsorbing volatile organic compounds when cool, each element contains one or more cooling coils embedded within it as shown in FIG. 3. Similarly, because such an element can best be desorbed of the volatile organic compounds when hot, each element also contains a plurality of electric heaters 178 embedded within it.

When the first regenerator is in preheat service, element 172a is electrically heated to purge the element of any volatile organic compounds that it may contain. Similarly, while the second regenerator is in cooling service, refrigerant is passed through the cooling coils of element 172b located at the outlet of the second regenerator so as to cool the element and adsorb any volatile organic compounds which may remain in the waste gas discharged from the second regenerator. The adsorption of the volatile organic compounds is especially needed immediately after the flow through the regenerators has been reversed.

Figure 4:
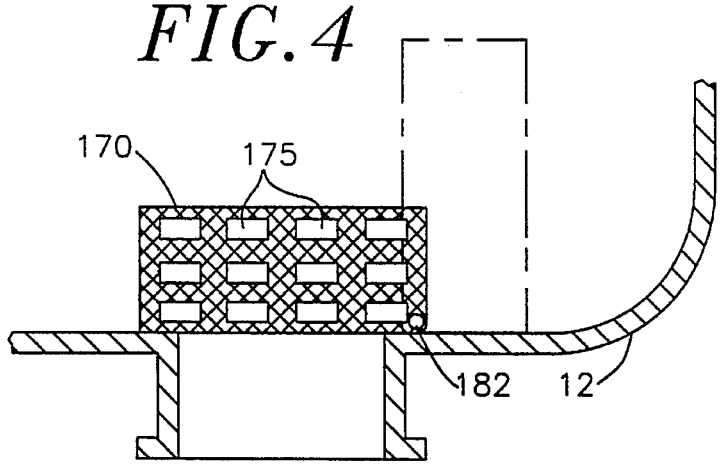
FIG. 4 is another embodiment of a trap for adsorbing volatile organic compounds.

In another embodiment of the present invention, as illustrated in FIG. 4, element 170 located at the outlet of a regenerator includes a plurality of thermo-electric heating and cooling chips 175. These chips are generally referred to as "cool-plates." Such chips are manufactured by Supercool Inc. of San Rafael, Calif. These chips are capable of both a cooling mode and a heating mode depending on the polarity of the voltage applied to the chip. Therefore, the same chips could be used for both cooling the element during adsorption of the volatile organic compounds and heating the element to desorb the volatile organic compounds from the element.

Because such chips put out about 50% more energy in the form of heat when in the heating mode, some external cooling of the chips may be required to prevent the chips from gradually heating up. Therefore, the chips can be mounted on either the internal or external surface of a conduit such as a rectangular tube which can be placed within or near the element. Air can be drawn through the tubes by either a blower or by natural draft to remove the excess heat. Several of such tubes can be placed within the element.

In one example, a thermal regenerative oxidizer of the present invention is designed to treat about 5000 standard cubic feet per minute of solvent-laden air containing about 0.3 by volume of volatile organic compounds. A trap element about 2.75 feet in diameter and having about 2 inches of sorbent such as activated carbon would be sufficient to adsorb approximately one pound of volatile organic compounds during a 10 second period of regenerator bed reversal. Approximately 240 chips 40 mm square and 6 mm thick and having a cooling rate of 25 watts each could be used to cool the element from a cycle high of about 265° F. to an adsorbing temperature of 100° F.

As a further option as also illustrated in FIG. 4, element 170 can be mounted on a hinge pin 182 so that it can mechanically be swung out of the way as illustrated by the phantom line in FIG. 4. Such a pivoting element can be swung into place before the flow is reversed so that the volatile organic compounds may be adsorbed by the element. Once the regenerator has been purged of any untreated waste gas, the element can be swung up and out of the way. By providing a pivoting element, the pressure drop through the system can be reduced.

Figure 5:
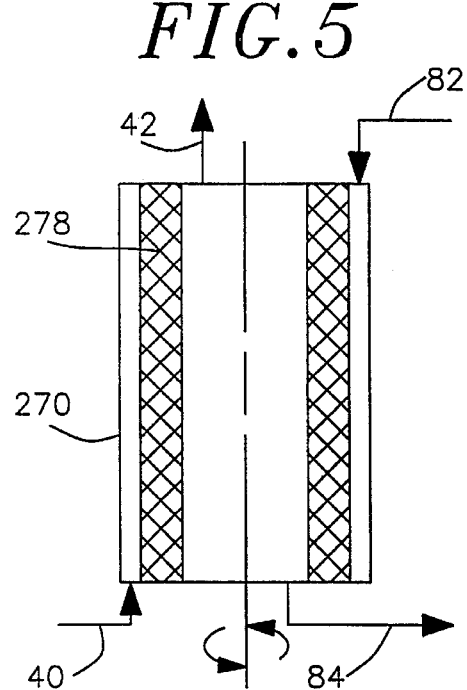
FIGS. 5 and 6 are schematic diagrams illustrating other embodiments of the invention.

In yet another embodiment as illustrated in FIG. 5, a rotating drum trap 270 is provided so that the cooling regenerator outlet from the thermal regenerative oxidizer can be continuously fed through the packing material 278 for adsorption of any remaining volatile organic compounds. The treated gas stream 42 can be vented to atmosphere. At the same time, at the opposite side of the trap, the drum trap is desorbed of volatile organic compounds by hot gas stream 82 that is recycled back to combine with the waste gas stream through hot gas recycle line 84.

Figure 6:
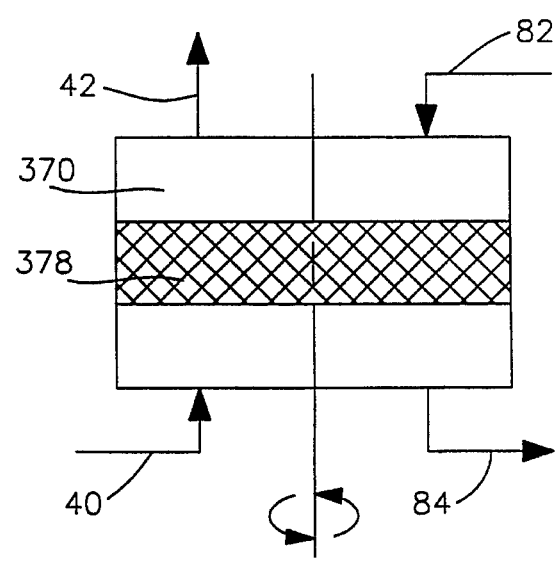

In FIG. 6 a rotating disk trap 370 is provided which also allows for the simultaneous adsorption and desorption of volatile organic compounds by the trap. The rotating disk trap includes a disk of adsorbent packing 378 for adsorbing any volatile organic compounds that may be contained in the cooling regenerator outlet gas, especially upon reversal of flow through the regenerators. The treated gas 42 can then be released to atmosphere. On an opposite side of the rotating disk trap, the adsorbent packing is desorbed of volatile organic compounds by a hot gas stream 82 that is recycled to combine with the waste gas stream through hot gas recycle line 84.

In still another embodiment of the present invention as illustrated in FIGS. 7a and 7b, an external trap 470 is used to adsorb remaining volatile organic compounds. This trap includes a damper assembly 471 for bypassing a sorbent element 472 during normal operations. When the regenerators are reversed, the element is engaged as shown in FIG. 7a to adsorb the volatile organic compounds from the untreated gas that is purged from the regenerator that has just been switched from heating service to cooling service.

The trap includes a central conduit 474 for receiving the cooling regenerator outlet stream 40. The central conduit has a lower portion 475 and an upper portion 476. Surrounding the central conduit is a sorbent chamber 478. When the trap is in service, the treated gas is directed from the central conduit, through a plurality of sorbent chamber inlet apertures 480, and into the inlet side 482 of the sorbent chamber. In the sorbent chamber, the gas passes through a sorbent element 472 where any remaining volatile organic compounds are adsorbed. The element contains sorbent such as activated carbon. The gas, now free of virtually all volatile organic compounds passes into the outlet side 484 of the sorbent chamber. From the outlet side, the gas is directed back into the upper portion 476 of the central conduit through a plurality of sorbent chamber outlet apertures 486. From the upper portion of the central conduit, the treated gas 42 can be released to atmosphere.

During normal operation, the gas from the cooling regenerator has been fully treated and need not pass through the element for removal of volatile organic compounds. During this normal operation as shown in FIG. 7b, the element is bypassed. The gas stream 40 from the cooling regenerator passes into the lower portion 471 of the central conduit and through vertical bypass slots 488 of a cap-shaped bypass valve 490 which separates the lower and upper portions of the central conduit. The gas continues into the upper portion 472 of the central conduit where the treated gas can be released to atmosphere.

When the gas stream is bypassing the element, the element can be desorbed of the volatile organic compounds which it has adsorbed. A stream of hot desorption gas 82 enters a desorption gas inlet 490 at the outlet side 484 of the sorbent chamber to desorb the volatile organic compounds from it. The hot gas continues through the element 472, on to the inlet side of the sorbent chamber and from the sorbent chamber through a desorption gas outlet 492. The desorption gas 84 can then be combined with the waste gas stream for further treatment.

The damper assembly 471 is used to control the flow of gas through the trap. A sorbent chamber inlet ring 502 and a sorbent chamber outlet ring 504 are mounted on a damper shaft 506 by a plurality of spokes 508. A bypass disk 510 is also fixedly mounted on the damper shaft. When the element is in service, as shown in FIG. 7a, the damper shaft is in a lower position. In this position, the bypass disk blocks flow of gas through the bypass slots of the bypass valve. The inlet and outlet rings are positioned to permit flow of gas through the inlet and outlet apertures so that the gas is directed through the element.

When the element is to be bypassed, as shown in FIG. 7b, the damper shaft is shifted to an upper position. In the upper position, the inlet and outlet rings are positioned to prevent flow of gas through the inlet and outlet apertures. The bypass disk also lifts to an upper position to permit the gas to bypass the element through the bypass slots. Once the flow is bypassed, valves (not shown) can be used to direct the hot gas into the sorbent chamber to desorb the element of the volatile organic compounds it has adsorbed.

Having now described the invention in detail, those skilled in the art will recognize that modifications and substitutions to the embodiments identified in the specification can be used to meet specific operational requirements. Such modifications and substitutions are intended to be within the scope of the invention as defined by the following claims.

What is claimed is:

1. A process for removing volatile organic compounds from a waste gas stream comprising the steps of:

heating the waste gas stream in a first regenerator in heating service to produce a heated waste gas stream;

oxidizing the volatile organic compounds in the heated waste gas stream to produce an oxidized waste gas stream;

cooling the oxidized waste gas stream in a second regenerator in cooling service;

periodically reversing flow through the regenerators so that the first regenerator is switched to cooling service and the second regenerator is switched to heating service;

adsorbing into a trap the volatile organic compounds from the untreated gas which remain in the cooling regenerator after the flow reversal step; and desorbing the volatile organic compounds from the trap.

2. The process of claim 1 wherein the step for desorbing the volatile organic compounds from the trap further comprises the step of passing a hot gas stream through the trap.

3. The process of claim 2 wherein the step for desorbing the volatile organic compounds from the trap further comprises the step of recycling the hot gas stream from the trap to combine with the waste gas stream.

4. The process of claim 2 further comprising the step of using hot air as the hot gas stream.

5. The process of claim 2 further comprising the step of producing the hot gas stream as a portion of the stream of oxidized waste gas from the oxidation chamber.

6. The process of claim 1 wherein the step for desorbing the volatile organic compounds from the trap comprises the step of heating the trap.

7. The process of claim 6 wherein the heating step comprises the step of electrically heating the trap.

8. The process of claim 1 wherein the step for adsorbing the volatile organic compounds from the untreated gas remaining in the regenerator in cooling service comprises the steps of:

cooling the trap; and passing the untreated gas through the trap.

9. The process of claim 8 wherein the step for cooling the trap comprises the step of passing a refrigerant through a cooling coil.

10. The process of claim 8 wherein the step for cooling the trap comprises the step of electrically cooling the trap with thermo-electric cooling chips.

11. The process of claim 1 further comprising the step of placing a trap into adsorbing service by mechanically placing the trap into the flow of waste gas from the regenerator in cooling service.

12. The process of claim 11 further comprising the step of taking the trap out of adsorbing service by mechanically removing the trap from the flow of waste gas from the regenerator in cooling service.

13. The process of claim 12 wherein the volatile organic compounds are desorbed from the trap after the trap has been taken out of adsorbing service.

* * * * *